No. 784,277. PATENTED MAR. 7, 1905.
T. A. QUINN.
REVERSING GEAR FOR MANDRELS OR OTHER SHAFTS.
APPLICATION FILED JULY 5, 1904.
2 SHEETS—SHEET 1.
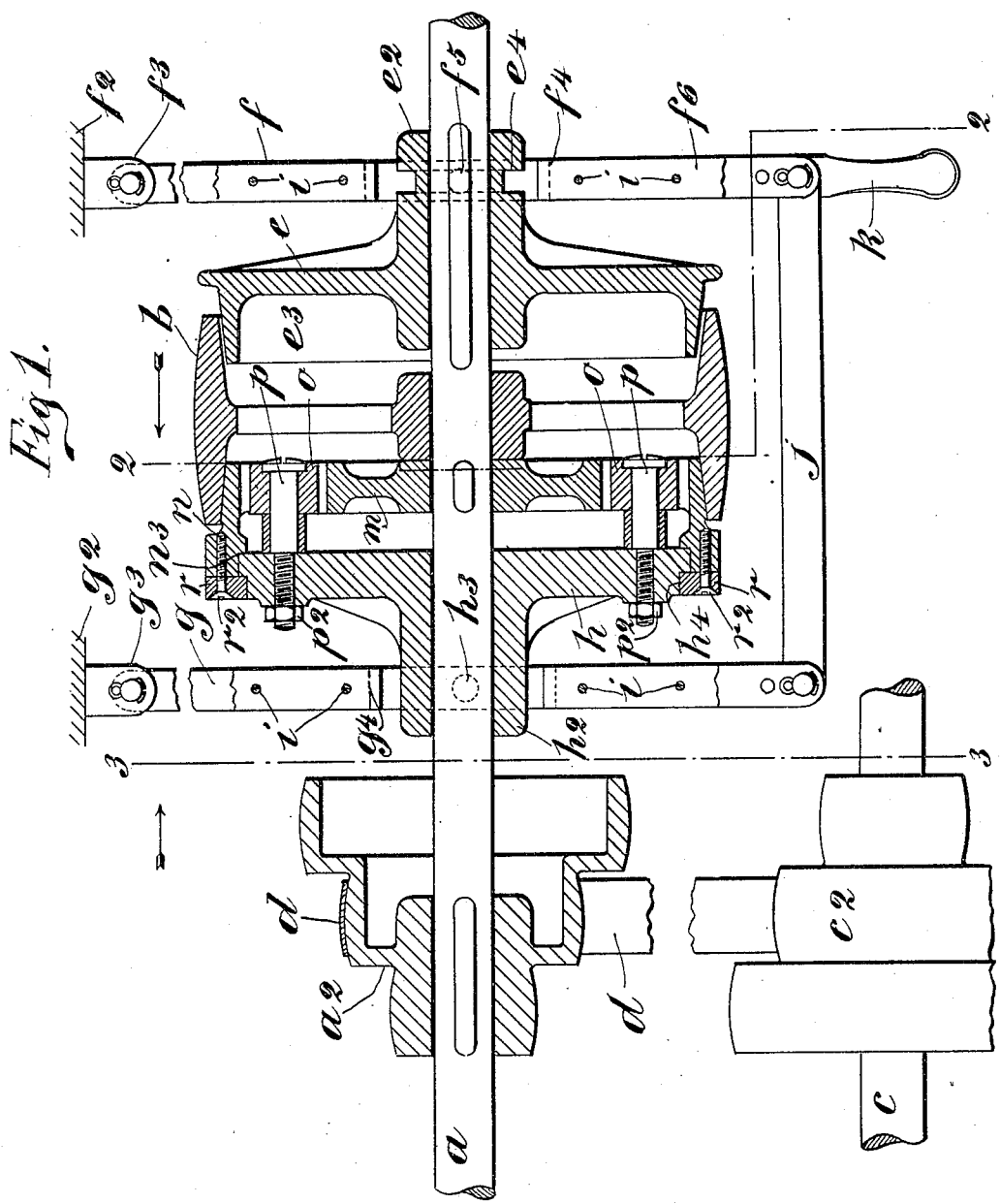
WITNESSES
O. P. Williams.
C. E. Mulreany
INVENTOR
Thomas A. Quinn
Edgar Tate & Co
BY ATTORNEYS No. 784,277. PATENTED MAR. 7, 1905.
T. A. QUINN.
REVERSING GEAR FOR MANDRELS OR OTHER SHAFTS.
APPLICATION FILED JULY 5, 1904.
2 SHEETS—SHEET 2.
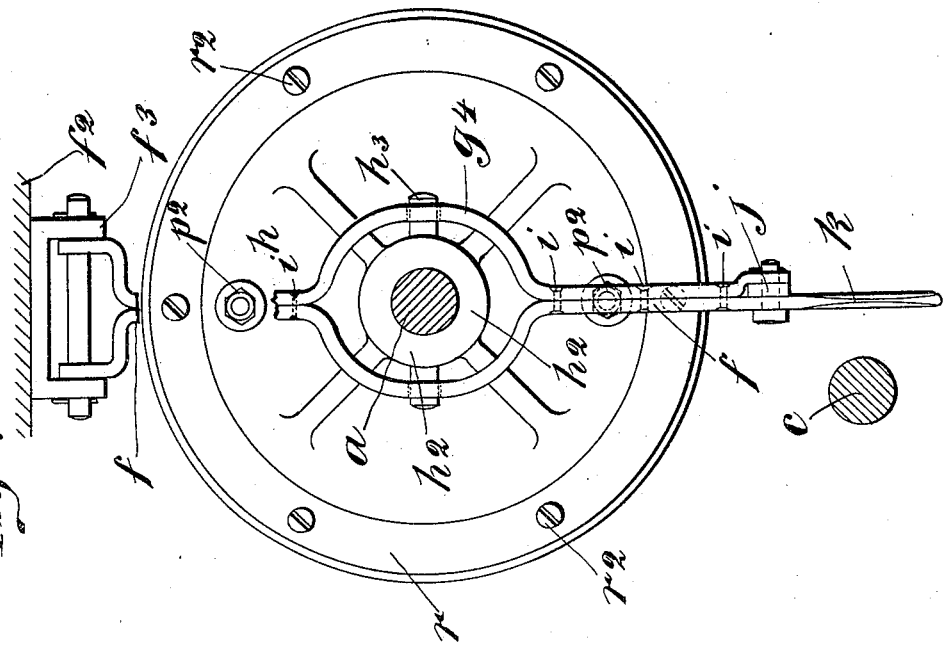
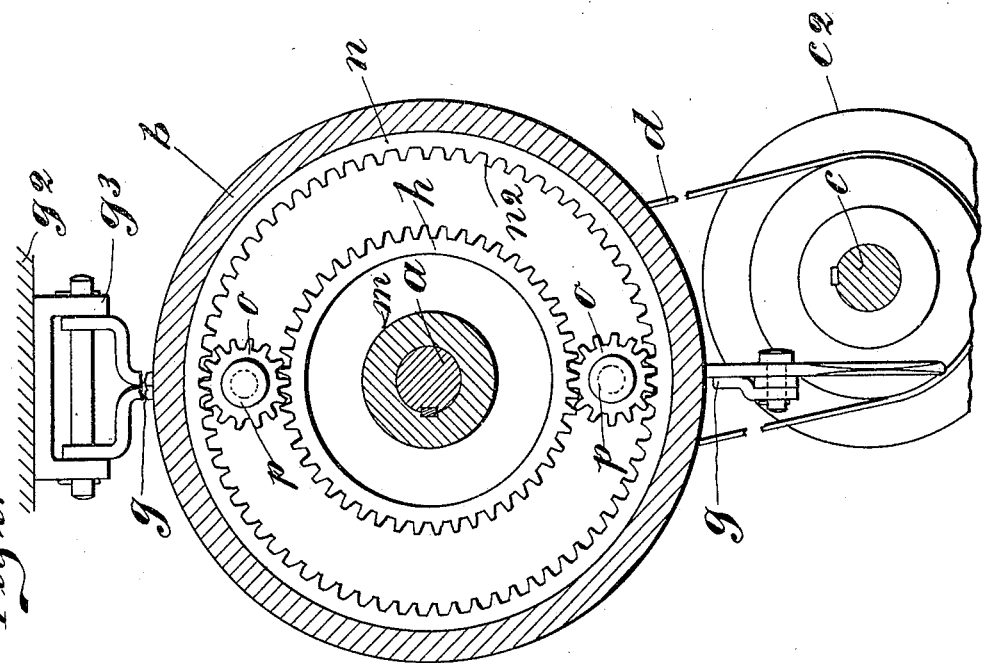
WITNESSES
O. P. Williams.
C. E. Mulreany
INVENTOR
Thomas A. Quinn
BY Edgar Tate & Co
ATTORNEYS No. 784,277.                                                            Patented March 7, 1905.

UNITED STATES PATENT OFFICE.

THOMAS A. QUINN, OF YONKERS, NEW YORK.

REVERSING-GEAR FOR MANDRELS OR OTHER SHAFTS.

SPECIFICATION forming part of Letters Patent No. 784,277, dated March 7, 1905.

Application filed July 5, 1904. Serial No. 215,205.

*To all whom it may concern:*

Be it known that I, THOMAS A. QUINN, a citizen of the United States, residing at Yonkers, in the county of Westchester and State of New York, have invented certain new and useful Improvements in Reversing-Gears for Mandrels or other Shafts, of which the following is a specification, such as will enable those skilled in the art to which it appertains to make and use the same.

The object of this invention is to provide an improved reversing-gear whereby the motion of a driven shaft may be conveniently reversed at any time and the direction of a mandrel or other shaft geared in connection therewith also reversed whenever desired and whereby the speed of said shafts may be increased or decreased as the motion thereof is reversed; and with this and other objects in view the invention consists in an apparatus of the class specified constructed as hereinafter described and claimed.

The invention is fully disclosed in the following specification, of which the accompanying drawings form a part, in which the separate parts of my improvement are designated by suitable reference characters in each of the views, and in which—

Figure 1 is a longitudinal section of my improved reversing-gear apparatus; Fig. 2, a section on the line 2 2 of Fig. 1, and Fig. 3 a section on the line 3 3 of Fig. 1.

In the drawings forming part of this specification I have shown at $a$ a driven shaft, which in practice is driven by a main power-shaft (not shown) and geared in connection with a pulley $b$, loosely mounted on the driven shaft $a$, by means of a belt or similar device, which is also not shown. I have also shown at $c$ a mandrel or similar shaft, and the driven shaft $a$ is provided with a cone-pulley $a^2$ and the mandrel-shaft $c$ with a similar cone-pulley $c^2$, and these pulleys are geared in connection by means of a belt $d$.

Mounted on the driven shaft $a$, at the right of the pulley $b$ and movable longitudinally on said shaft, is a clutch-disk $e$, provided with a hub $e^2$ and a flange or rim $e^3$, adapted to operate within and upon the adjacent flange or rim of the pulley $b$, and suspended from any suitable support $f$ is a hanger $f^2$, which is pivotally connected with a supplemental yoke-shaped support $f^3$, connected with the support $f^2$ and which is adapted to swing longitudinally of the driven shaft, and the hanger $f$ is provided with a collar $f^4$, having side pins $f^5$, one of which is shown in dotted lines in Fig. 1, and the pins $f^5$ operate in an annular groove $e^4$ in the hub $e^2$ of the disk $e$, and said hanger is also provided with a depending handle portion $f^6$, by which it may be operated and the disk $e$ moved toward and from the pulley $b$.

At the left-hand side of the pulley $b$ is another hanger, $g$, suspended from any suitable support $g^2$, provided with the yoke-shaped supplemental support $g^3$, with which the hanger $g$ is pivotally connected, and said hanger $g$ is provided with a collar $g^4$, through which the driven shaft $a$ passes.

Mounted on the driven shaft $a$, at the left of the pulley $b$ and movable on said shaft, is a gear-disk $h$, having a hub $h^2$, which also passes through the collar $g^4$ of the hanger $g$ and is provided with trunnions $h^3$, which pass outwardly through the opposite sides of the collar $g^4$, and in the form of construction shown the hangers $f$ and $g$ are made of separate pieces of strap-iron bolted together, as shown at $i$, and in Fig. 1 the section-line passes between the separate parts of these hangers, and the bolts $i$ are shown in section between the top and bottom portions of said hangers, and the lower ends of said hangers are connected by a link or rod $j$, parallel with the driven shaft $a$ and one of said hangers. That at the right of the pulley $b$ in the form of construction shown is provided with a handle $k$, by which both of said hangers may be operated.

Mounted on the driven shaft, adjacent to the pulley $b$, is a gear-wheel $m$, which is of much less diameter than said pulley, and secured to the perimeter of the disk $h$ is a clutch flange or rim $n$, which extends in the direction of the pulley $b$ and is adapted to operate within and upon the corresponding flange or rim of said pulley, and said clutch flange or rim is provided with an internal gear $n^2$, and between the clutch flange or rim $n$ and the gear-wheel $m$ and at opposite points in the construction shown are two pinions $o$, which are connected with the disk $h$ by suitable spindles or bolts $p$, which in the form of construction shown are made in the manner of screws and screwed into and through the disk $h$ and held in place by nuts $p^2$, and said pinions $o$ mesh with the gear-wheel $m$ and with the internal gear $n^2$ of the clutch flange or rim $n$.

The clutch flange or rim $n$ in the form of construction shown is connected with the disk $h$, as shown in Fig. 1, said disk being provided in its perimeter with an annular groove $h^4$, in which is placed a ring or band $r$, and the clutch flange or rim $n$ is provided in the inner face of the base portion thereof with an annular groove $n^3$, and the ring or band $r$ and the clutch flange or rim are bolted or screwed together, as shown at $r^2$.

The operation will be readily understood from the foregoing description when taken in connection with the accompanying drawings and the following statement thereof. It will be understood that the pulley $b$ in practice is driven by means of a belt from a main power-shaft, as hereinbefore stated, said power-shaft and belt being not shown, and if the hangers $f$ and $g$ be swung to the left the clutch $e$ or the rim or flange $e^3$ thereof will engage the pulley $b$ and the driven shaft $a$ will be turned in the same direction as the main power-shaft. If the hangers $f$ and $g$ be swung to the right, the disk $e$ or the flange or rim $e^3$ thereof will be disconnected from the pulley $b$ and the clutch flange or rim $n$ of the disk $h$ will engage said pulley, as shown in Fig. 1, and the motion of the shaft $a$ will be reversed, and the speed of the shaft $a$ will be less when moving in this direction than when driven by the disk $e$.

It will be understood that the reversal of the shaft $a$ is occasioned by the pinions $o$ operating in connection with the gear-wheel $m$, and the relative sizes of these pinions and said gear-wheel will also determine to an extent the speed of the shaft $a$, and it is also evident that one of the pinions $o$ would be sufficient to operate the shaft $a$; but by employing two of said pinions in the manner shown and described the apparatus is balanced and the operation thereof rendered more even and uniform and the friction and strain on the parts is reduced.

My improved reversing-gear may be employed wherever apparatus of this class is desired, and changes in and modifications of the construction thereof as herein described may be made without departing from the spirit of my invention or sacrificing its advantages.

Having fully described my invention, what I claim as new, and desire to secure by Letters Patent, is—

1. In an apparatus of the class described, a driven shaft, a pulley loosely mounted thereon, hangers suspended at the opposite sides of said pulley and adapted to swing in a vertical plane and through which said shaft passes, a clutch-disk mounted on one side of said pulley, and in operative connection with one of said hangers and adapted to move longitudinally on said shaft, a gear-disk mounted on the opposite side of said pulley and in operative connection with the other hanger and adapted to move longitudinally of said shaft, a gear-wheel secured to said shaft between the last-named disk and the pulley, a clutch flange or rim connected with the perimeter of the gear-disk and adapted to operate in connection with the pulley and provided with an internal gear, and pinions connected with said disk within the clutch flange or rim, and operating in connection therewith and in connection with said gear-wheel, substantially as shown and described.

2. In an apparatus of the class described, a driven shaft, a pulley loosely mounted thereon, hangers suspended at the opposite sides of said pulley and adapted to swing in a vertical plane and through which said shaft passes, a clutch-disk mounted on one side of said pulley, and in operative connection with one of said hangers and adapted to move longitudinally on said shaft, a gear-disk mounted on the opposite side of said pulley and in operative connection with the other hanger and adapted to move longitudinally of said shaft, a gear-wheel secured to said shaft between the last-named disk and the pulley, a clutch flange or rim connected with the perimeter of the gear-disk and adapted to operate in connection with the pulley and provided with an internal gear, and pinions connected with said disk within the clutch flange or rim, and operating in connection therewith and in connection with said gear-wheel, said hangers being in operative connection at their lower ends, substantially as shown and described.

3. In an apparatus of the class described, a driven shaft, a pulley loosely mounted thereon, hangers suspended at the opposite sides of said pulley and adapted to swing in a vertical plane and provided with collars through which said shaft passes, a gear-wheel secured to said shaft at one side of said pulley, a clutch-disk mounted on said shaft at one side of said pulley and in operative connection with the adjacent hanger and adapted to operate in connection with said pulley, another disk mounted on the opposite side of said pulley and adjacent to said gear-wheel and movable longitudinally of said shaft and in operative connection with the adjacent hanger, said last-named disk being provided with a clutch flange or rim adapted to operate in connection with said pulley and having an internal gear, and a pinion connected with said disk and operating in connection with said gear and also in connection with said gear-wheel, substantially as shown and described.

4. In an apparatus of the class described, a driven shaft, a pulley loosely mounted thereon, hangers suspended at the opposite sides of said pulley and adapted to swing in a vertical plane and provided with collars through which said shaft passes, a gear-wheel secured to said shaft at one side of said pulley, a clutch-disk mounted on said shaft at one side of said pulley and in operative connection with the adjacent hanger and adapted to operate in connection with said pulley, another disk mounted on the opposite side of said pulley and adjacent to said gear-wheel and movable longitudinally of said shaft and in operative connection with the adjacent hanger, said last-named disk being provided with a clutch flange or rim adapted to operate in connection with said pulley and having an internal gear, and a pinion connected with said disk and operating in connection with said gear and also in connection with said gear-wheel, said hangers being in operative connection, substantially as shown and described.

In testimony that I claim the foregoing as my invention I have signed my name, in presence of the subscribing witnesses, this 2d day of July, 1904.

THOMAS A. QUINN.

Witnesses:
C. E. MULREANY,
C. J. KLEIN.